(12) United States Patent
Aposhian et al.

(10) Patent No.: US 11,864,498 B2
(45) Date of Patent: Jan. 9, 2024

(54) FORMING A SOD ROLL

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Mark C. LeBlanc, Salt Lake City, UT (US); Austin J. Neuner, Layton, UT (US); Seth W. Jeppson, Clearfield, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 768 days.

(21) Appl. No.: 16/370,995

(22) Filed: Mar. 31, 2019

(65) Prior Publication Data

US 2020/0305358 A1  Oct. 1, 2020

(51) Int. Cl.
*A01G 20/12* (2018.01)

(52) U.S. Cl.
CPC .................................. *A01G 20/12* (2018.02)

(58) Field of Classification Search
CPC ................................ A01G 20/12; A01G 20/00
See application file for complete search history.

(56) References Cited

U.S. PATENT DOCUMENTS

| | | |
|---|---|---|
| 3,664,432 A | 5/1972 | Nunes, Jr. |
| 3,698,534 A | 10/1972 | Hadfield |
| 4,966,239 A | 10/1990 | Hutchison |
| 7,021,584 B2 * | 4/2006 | Hendriks ............... A01G 20/12 242/534 |
| 8,813,861 B2 * | 8/2014 | Stefanski ............... A01G 20/15 172/19 |
| 8,978,779 B2 * | 3/2015 | Aposhian ............... A01G 20/12 172/19 |
| 9,426,937 B2 * | 8/2016 | Sammut ................. A01G 20/12 |
| 9,629,296 B2 * | 4/2017 | Aposhian ............... A01G 20/12 |

(Continued)

FOREIGN PATENT DOCUMENTS

| | | |
|---|---|---|
| CN | 1723753 A | 1/2006 |
| WO | 2004006644 A1 | 1/2004 |

OTHER PUBLICATIONS

International Searching Authority, International Search Report and the Written Opinion, dated Jun. 29, 2020.

*Primary Examiner* — Thomas B Will
*Assistant Examiner* — Joel F. Mitchell
(74) *Attorney, Agent, or Firm* — Kirton McConkie; Brian Tucker

(57) ABSTRACT

A roll forming mechanism can include a passive roll-up mechanism that initiates the roll and an active roll-up mechanism that completes the roll. The active roll-up mechanism can include an upper conveyor that is rotated in different directions. The upper conveyor can initially be rotated in a direction opposite that of an inclined conveyor to cause a forming roll to advance along the inclined conveyor. The rotation of the upper conveyor can then be reversed to cause the roll to be completed. Then, the upper conveyor can again be rotated in the direction opposite that of the inclined conveyor to cause the completed roll to be transferred towards the stacking conveyor. The amount by which the upper conveyor is rotated in the reverse direction can be based on a detected length of a tail of the forming roll.

20 Claims, 15 Drawing Sheets

(56) References Cited

U.S. PATENT DOCUMENTS

| | | | |
|---|---|---|---|
| 9,648,797 B2 * | 5/2017 | Sammut | A01B 76/00 |
| 2004/0188106 A1 | 9/2004 | Hendriks et al. | |
| 2014/0131057 A1 | 5/2014 | Stefanski et al. | |
| 2015/0021426 A1 | 1/2015 | Sammut | |
| 2015/0245555 A1 | 9/2015 | Sammut | |
| 2015/0359160 A1 | 12/2015 | Aposhian et al. | |

* cited by examiner

FORMING A SOD ROLL

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1. Sod harvester 100 is in the form of a tractor and includes a cutting head 101 that cuts slabs of sod from the ground, inclined conveyor(s) 102 that elevate the slabs from the ground towards a stacking conveyor 103, a stacking head 105 that is mounted to a support mechanism 104, and a pallet dispenser 106 that is positioned adjacent a pallet support (not visible) on which stacking head 105 stacks slabs that it has removed from stacking conveyor 103.

Two general types of harvesters exist: slab harvesters; and roll harvesters. A roll harvester forms the slabs of sod into rolls which are then accumulated on the stacking conveyor for pick up. A slab harvester, on the other hand, directly stacks the slabs in their flat form. Sod harvester 100 represents a slab harvester.

BRIEF SUMMARY

The present invention extends to techniques for forming a sod roll and to sod harvesters that are configured to implement these techniques. A roll forming mechanism can include a passive roll-up mechanism that initiates the roll and an active roll-up mechanism that completes the roll. The active roll-up mechanism can include an upper conveyor that is rotated in different directions. The upper conveyor can initially be rotated in a direction opposite that of an inclined conveyor to cause a forming roll to advance along the inclined conveyor. The rotation of the upper conveyor can then be reversed to cause the roll to be completed. Then, the upper conveyor can again be rotated in the direction opposite that of the inclined conveyor to cause the completed roll to be transferred towards the stacking conveyor. The amount by which the upper conveyor is rotated in the reverse direction can be based on a detected length of a tail of the forming roll.

In one embodiment, the present invention is implemented as a method for forming a roll of sod. A slab of sod that is being rolled is monitored as the slab of sod travels along one or more inclined conveyors. Based on the monitoring, an upper conveyor that is positioned above the one or more inclined conveyors is rotated a specified amount in a first direction that matches a direction of rotation of the one or more inclined conveyors to thereby cause the slab of sod to be formed into a roll. After the slab of sod has been formed into the roll, the upper conveyor is rotated in a second direction opposite the first direction to thereby cause the roll to be advanced along the one or more inclined conveyors towards a stacking conveyor.

In another embodiment, the present invention is implemented as a sod harvester that includes: a cutting head for cutting slabs of sod from the ground; one or more inclined conveyors for conveying the slabs of sod towards a stacking conveyor; a first roll-up mechanism that is positioned overtop the one or more inclined conveyors, the first roll-up mechanism being configured to commence forming the slabs of sod into rolls as the slabs of sod travel along the one or more inclined conveyors; a second roll-up mechanism that is also positioned overtop the one or more inclined conveyors, the second roll-up mechanism including an upper conveyor that is configured to complete forming the slabs of sod into rolls; one or more sensors; and control circuitry that is configured to control rotation of the upper conveyor based on signals received from the one or more sensors. The control circuitry causes the upper conveyor to rotate a specified amount in a first direction that matches a direction of rotation of the one or more inclined conveyors to thereby complete forming the slabs of sod into rolls and then to rotate in a second direction opposite the first direction to thereby cause the rolls to be advanced along the one or more inclined conveyors towards the stacking conveyor.

In another embodiment, the present invention is implemented as a method for forming a roll of sod. A length of a tail of a slab of sod is detected as the slab of sod is being formed into a roll while the slab of sod advances along one or more inclined conveyors. It is also detected when the slab of sod has reached a front end of an upper conveyor that is positioned above the one or more inclined conveyors. When the slab of sod has reached the front end of the upper conveyor, the upper conveyor is rotated in a direction that is opposite a direction of rotation of the one or more inclined conveyors to thereby cause the slab of sod to be advanced under the upper conveyor. While the slab of sod remains under the upper conveyor, the upper conveyor is rotated a specified amount in a reverse direction to thereby cause the slab of sod to be formed into a complete roll. After the slab of sod has been formed into the complete roll, the upper conveyor is rotated in the direction that is opposite the direction of rotation of the one or more inclined conveyors to thereby cause the roll to be advanced along the one or more inclined conveyors towards a stacking conveyor.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle. The term "belt" should be construed as the moving portion of a conveyor that contacts a slab of sod.

Figure 1:
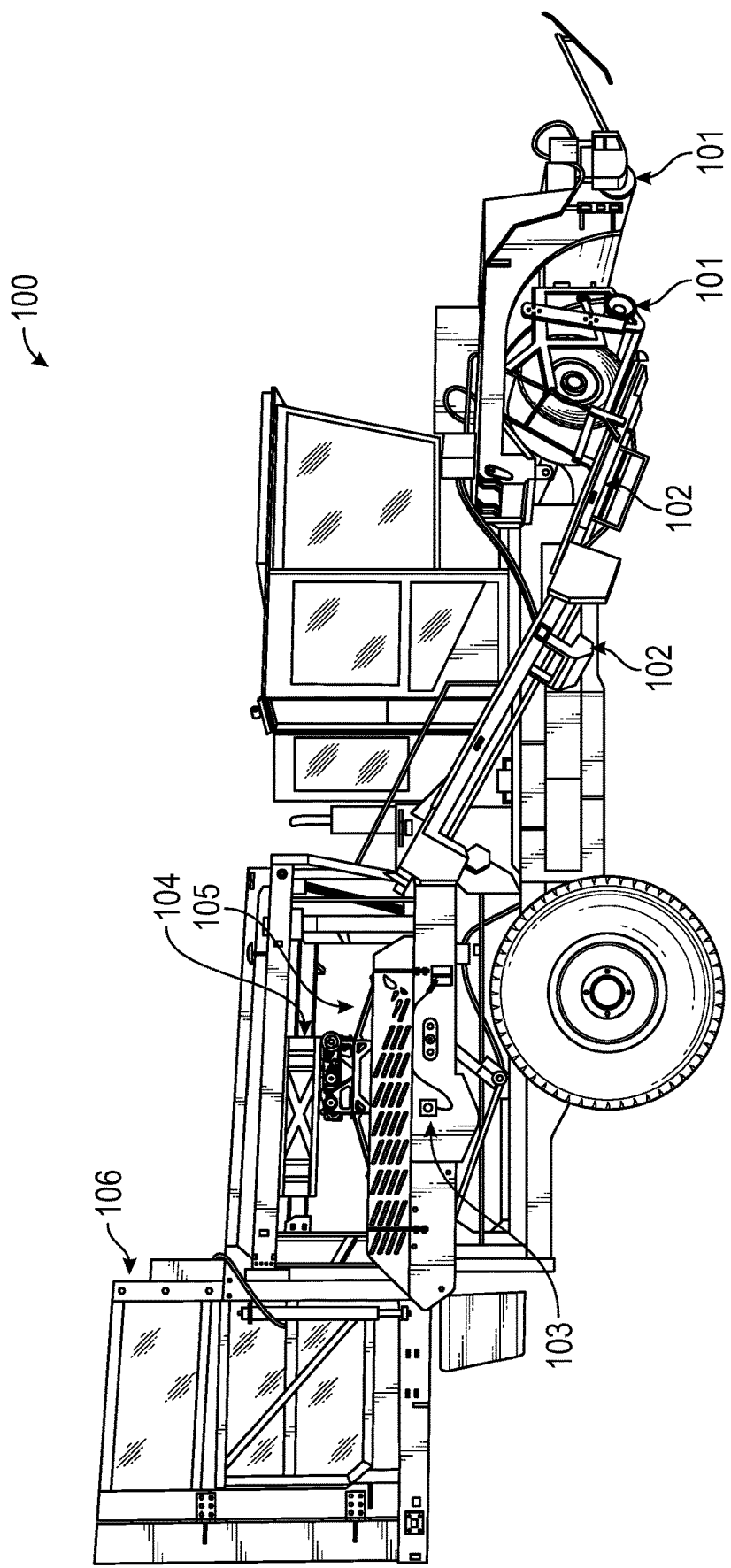
FIG. 1 illustrates a prior art sod harvester.
Figure 2:
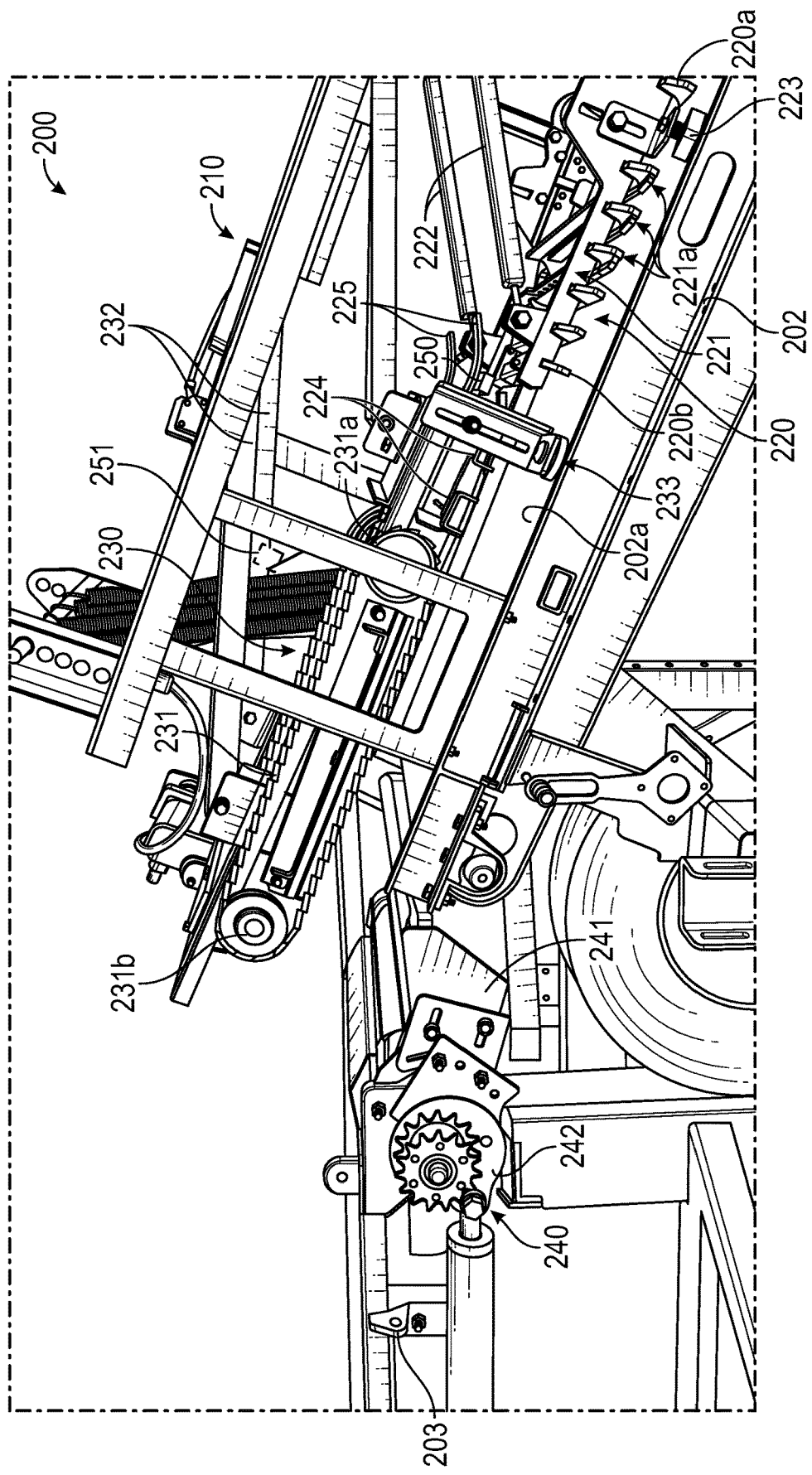
FIG. 2 illustrates a roll forming mechanism that can be used on a sod harvester.

FIG. 2 illustrates a roll forming mechanism 210 on a sod harvester 200. Sod harvester 200 is shown as including an inclined conveyor 202 and a stacking conveyor 203. Although not shown, sod harvester 200 would also include a stacking head and corresponding support mechanism. Accordingly, sod harvester 200 generally resembles sod harvester 100 shown in FIG. 1 except that it is configured as a roll harvester.

Sod harvester 200 includes a lift mechanism 240 that is positioned between inclined conveyor 202 and stacking conveyor 203 and functions to transfer rolls onto stacking conveyor 203. Lift mechanism 240 includes a lift paddle 241 that is coupled to stacking conveyor 203 via a bearing 242. Lift paddle 241 is similar to the lift paddle disclosed in U.S. Pat. No. 5,230,602 and will be described in more detail below. It is noted, however, that roll forming mechanism 210 can be employed on a sod harvester regardless of how rolls are transferred onto stacking conveyor 203.

Roll forming mechanism 210 encompasses inclined conveyor 202 (which can represent one or more conveyors) and includes a passive roll-up mechanism 220 and an active roll-up mechanism 230. Passive roll-up mechanism 220 includes a ridge structure 221 that extends between a leading end 220a and a trailing end 220b of passive roll-up mechanism 220. Ridge structure 221 includes a series of downwardly projecting ridges 221a which function to cause a slab to roll backwards as the slab advances along belt 202a of inclined conveyor 202. Ridge structure 221 is supported from arms 222 which allow ridge structure 221 to move upwardly as the roll is forming. One or more stops 223 extend from passive roll-up mechanism 220 and contact inclined conveyor 202 to maintain a minimum distance between ridge structure 221 and belt 202a.

Active roll-up mechanism 230 is positioned between passive roll-up mechanism 220 and stacking conveyor 203 and includes an upper conveyor 231 having a leading end 231a and a trailing end 231b. Active roll-up mechanism 230 is supported from arms 232 which allow active roll-up mechanism 230 to move upwardly as the roll is forming. One or more stops 233 extend from active roll-up mechanism 230 and contact inclined conveyor 202 to maintain a minimum distance between upper conveyor 231 and belt 202a.

Upper conveyor 231 can be configured so that its trailing end 231b extends overtop lift mechanism 240 or overtop stacking conveyor 203 when lift mechanism 240 is not employed. By extending upper conveyor 231 in this manner, a completed roll can be prevented from unrolling while it is transferred to the stacking conveyor as will be described below.

In the depicted embodiment, downwardly projecting ridges 224 extend from active roll-up mechanism 230 and are positioned between upper conveyor 231 and ridge structure 221. Ridges 224 function in a similar manner as ridges 221a of ridge structure 221 (i.e., they continue the passive roll-up process). To synchronize the height of passive roll-up mechanism 220 relative to active roll-up mechanism 230, active roll-up mechanism 230 includes extensions 225 which are positioned above passive roll-up mechanism 220 such that, as a roll causes passive roll-up mechanism 220 to be lifted, active roll-up mechanism 230 will also be lifted. This synchronization ensures that ridges 224 are generally aligned vertically with ridges 221a when a roll is being transitioned to ridges 224.

The specific structure of passive roll-up mechanism 220 is only one example of a suitable passive roll-up mechanism that can be used in embodiments of the present invention. As will become apparent below, other configurations of a passive roll-up mechanism can equally be used. Additionally, the inclusion of ridges 224 on active roll-up mechanism 230 is one example configuration and other configurations could equally be employed.

Roll forming mechanism 210 also includes one or more sensors 250 that are positioned overtop, within or proximate to ridge structure 221. Sensor 250 can represent any type of sensor that is capable of sensing a slab of sod as it is being rolled up along inclined conveyor 202. For example, sensor 250 could be a laser-based sensor or a mechanical sensor. Roll forming mechanism 210 may also include one or more additional sensors including, for example, sensor 251 that is positioned overtop, within or proximate to upper conveyor 231. Sensor 251 can also represent any type of sensor that is capable of sensing a slab of sod (or the presence of a slab of sod) as it is being rolled up along inclined conveyor 202. The role of such sensors will be described below. Each sensor can be coupled to control circuitry 260 (see FIGS. 2A-2H) which can control roll forming mechanism 210 based at least partially on signals received from each sensor. Control circuitry 260 can be any suitable type of circuitry such as a processor, a microcontroller, an FPGA, an ASIC, a PLC, etc.

Figure 2A:
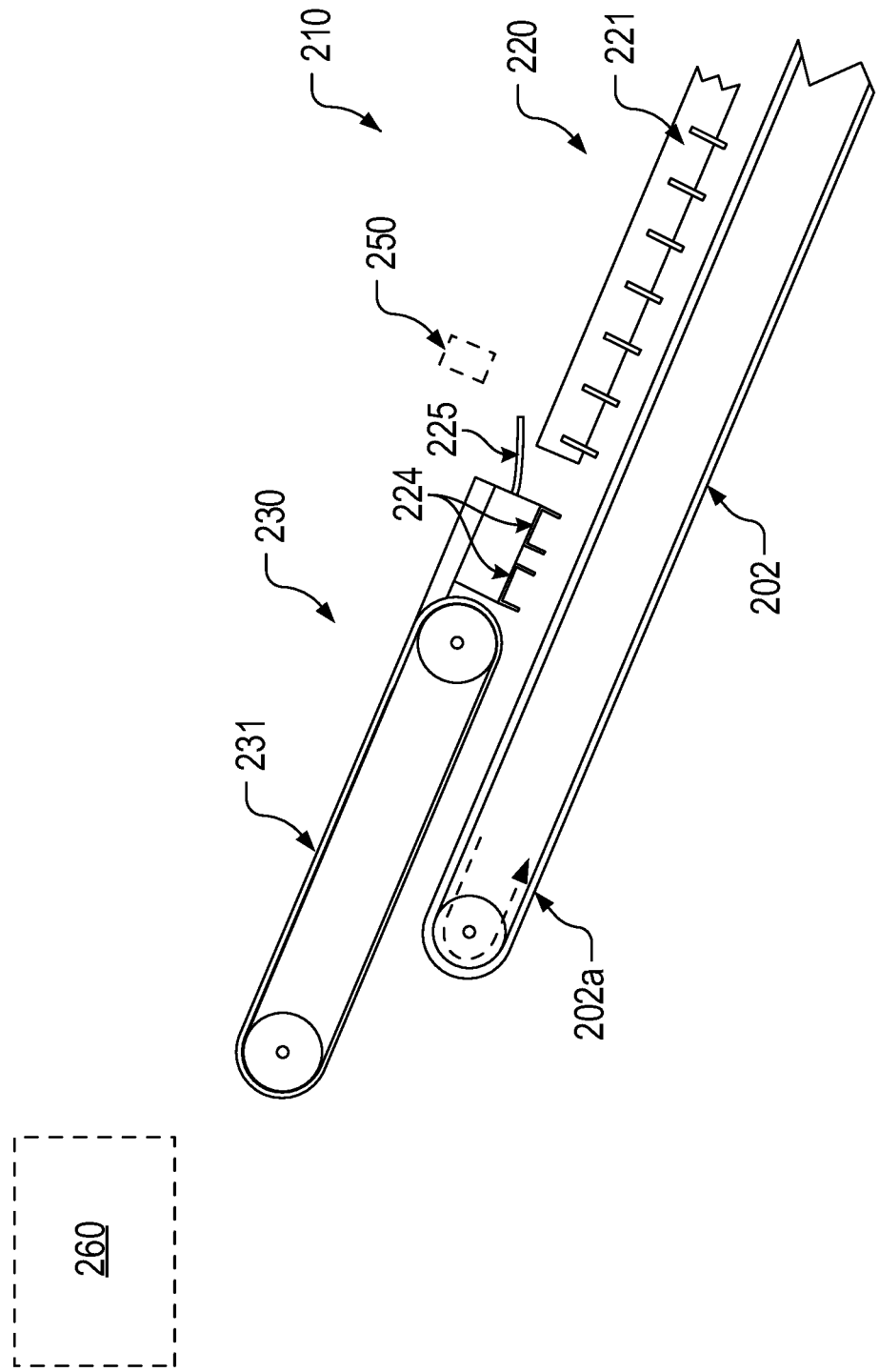
FIGS. 2A-2H illustrate how the roll forming mechanism can form a sod roll and transfer it to a stacking conveyor.

FIGS. 2A-2H illustrate how roll forming mechanism 210 functions to form a sod roll and transfer it to stacking conveyor 203. FIG. 2A represents roll forming mechanism 210 before a slab of sod has entered passive roll-up mechanism 220. As indicated by the arrow, belt 202a of inclined conveyor 202 is rotated to cause slabs that are cut from the ground to be conveyed upwardly along inclined conveyor 202. For the sake of clarity, the direction of rotation of inclined conveyor 202 will be considered counter-clockwise in the remaining description. In FIGS. 2A-2H, sensor 250 is shown as being positioned above ridge structure 221 and is assumed to be a laser-based sensor.

Figure 2B:
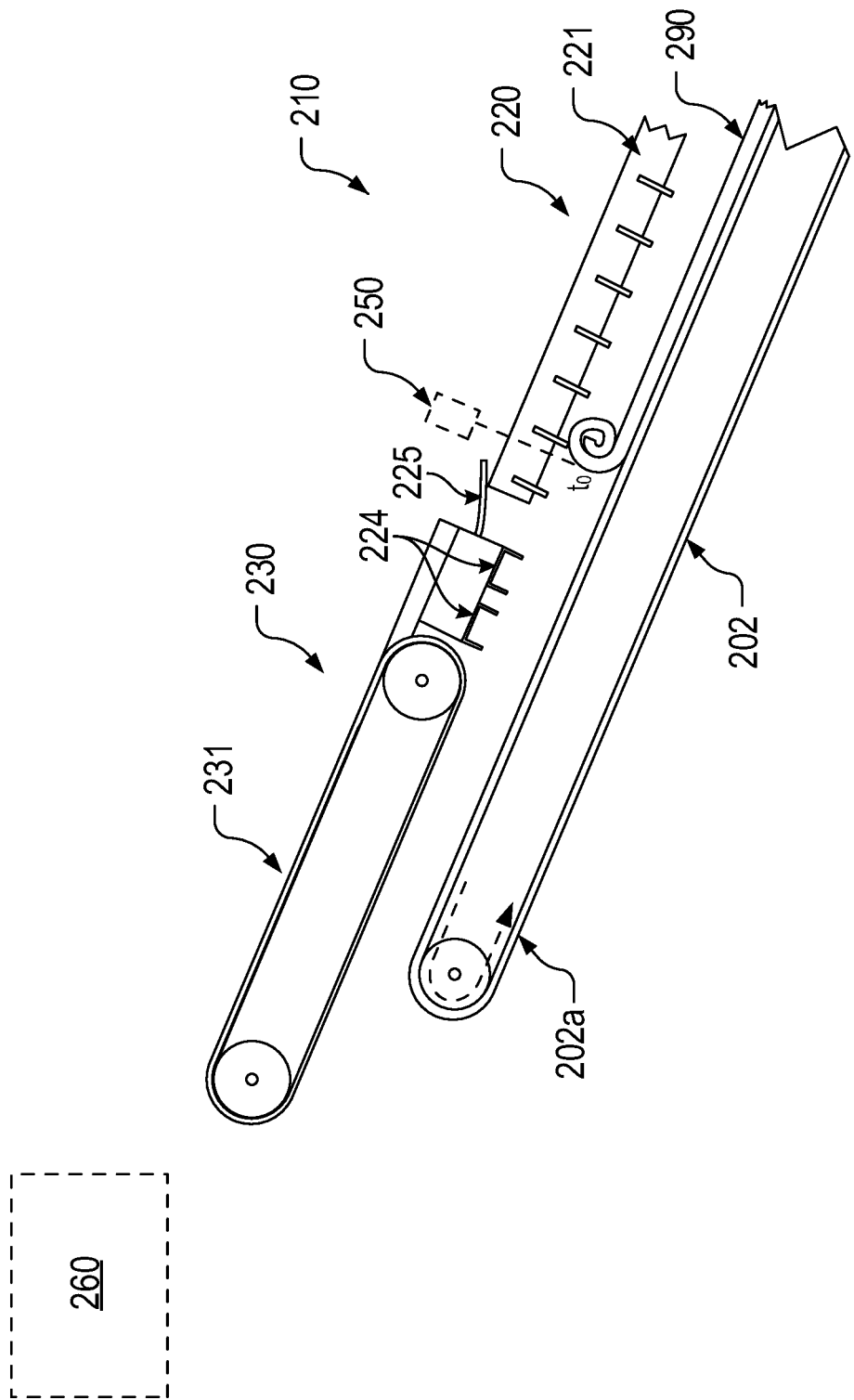

In FIG. 2B, it is assumed that a slab 290 has been advanced under passive roll-up mechanism 220 and therefore is being formed into a roll. As the forming roll advances along inclined conveyor 202, it will eventually pass under sensor 250. In this example, the time at which the forming roll reaches sensor 250 will be referred to as time $t_0$.

In this example where sensor 250 is assumed to be a laser that detects the distance to the nearest object, prior to $t_0$, inclined conveyor 202 will be the nearest object such that sensor 250 will detect a constant distance. Then, at $t_0$, sensor 250 will detect the presence of the forming roll. In embodiments where sensor 250 may be mechanical, this same sensing could be accomplished as ridged structure 221 is lifted against the sensor. Accordingly, at time $t_0$, control circuitry 260 will detect, based on signals received from sensor 250, that a roll is advancing through passive roll-up mechanism 220. In other words, control circuitry 260 employs sensor 250 to detect the leading edge of a forming roll.

Figure 2C:
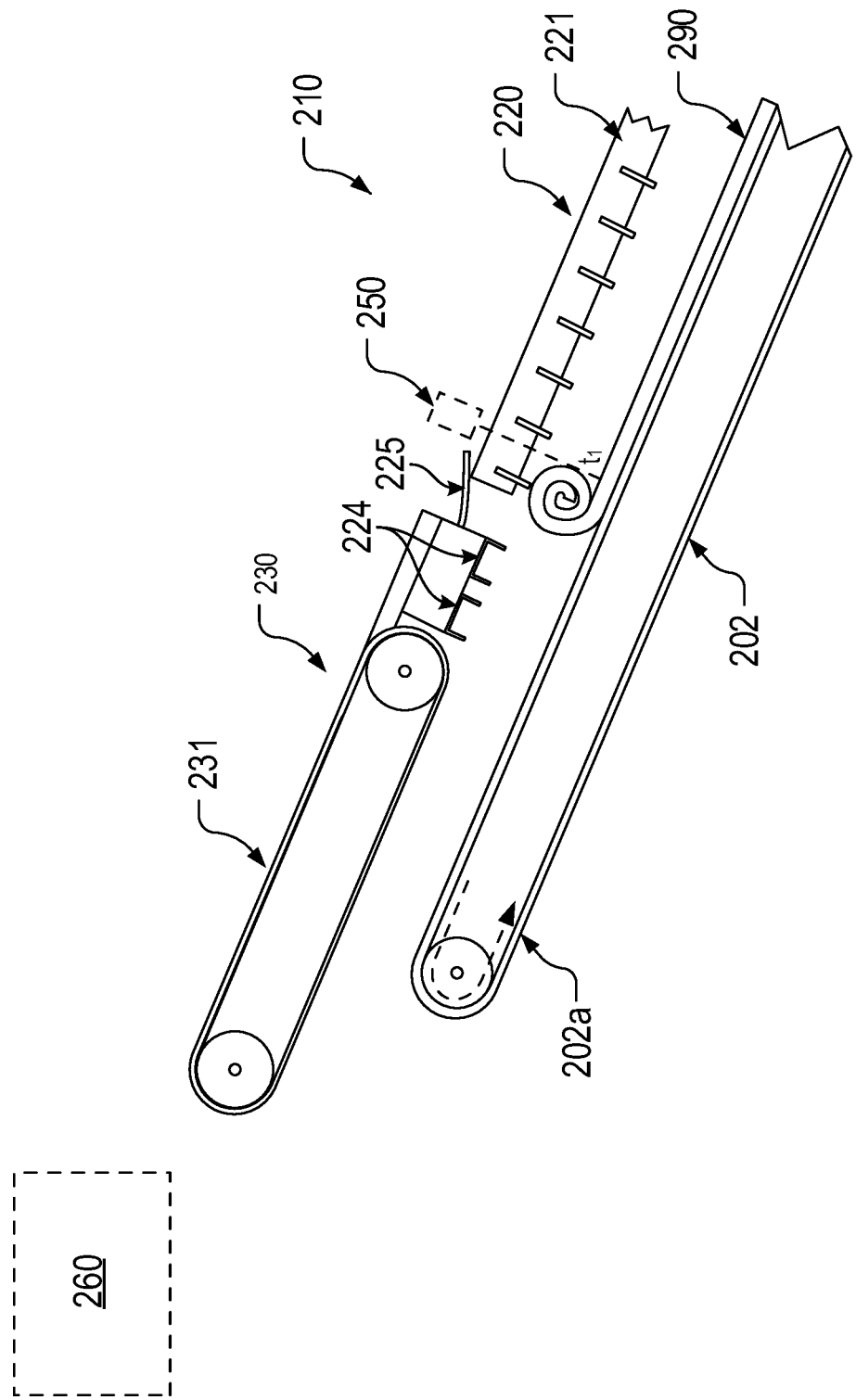

After control circuitry 260 identifies the leading edge of a forming roll, it can commence monitoring for the trailing edge of the forming roll. For example, as represented in FIG. 2C, as inclined conveyor 202 continues to advance slab 290, sensor 250 will detect a slightly varying distance due to the curvature of the forming roll. Then, at time $t_1$, the trailing edge of the forming roll will pass beyond sensor 250 which will cause sensor 250 to report a significant change in the distance. Control circuitry 260 can be configured to detect this significant change in distance as the trailing edge of the forming roll. For example, control circuitry 260 can be configured to identify when sensor 250 reports an increase in distance that occurs within a specified amount of time and that exceeds a defined threshold. Control circuitry 260 can record the value of to for use in subsequent calculations.

Figure 2D:
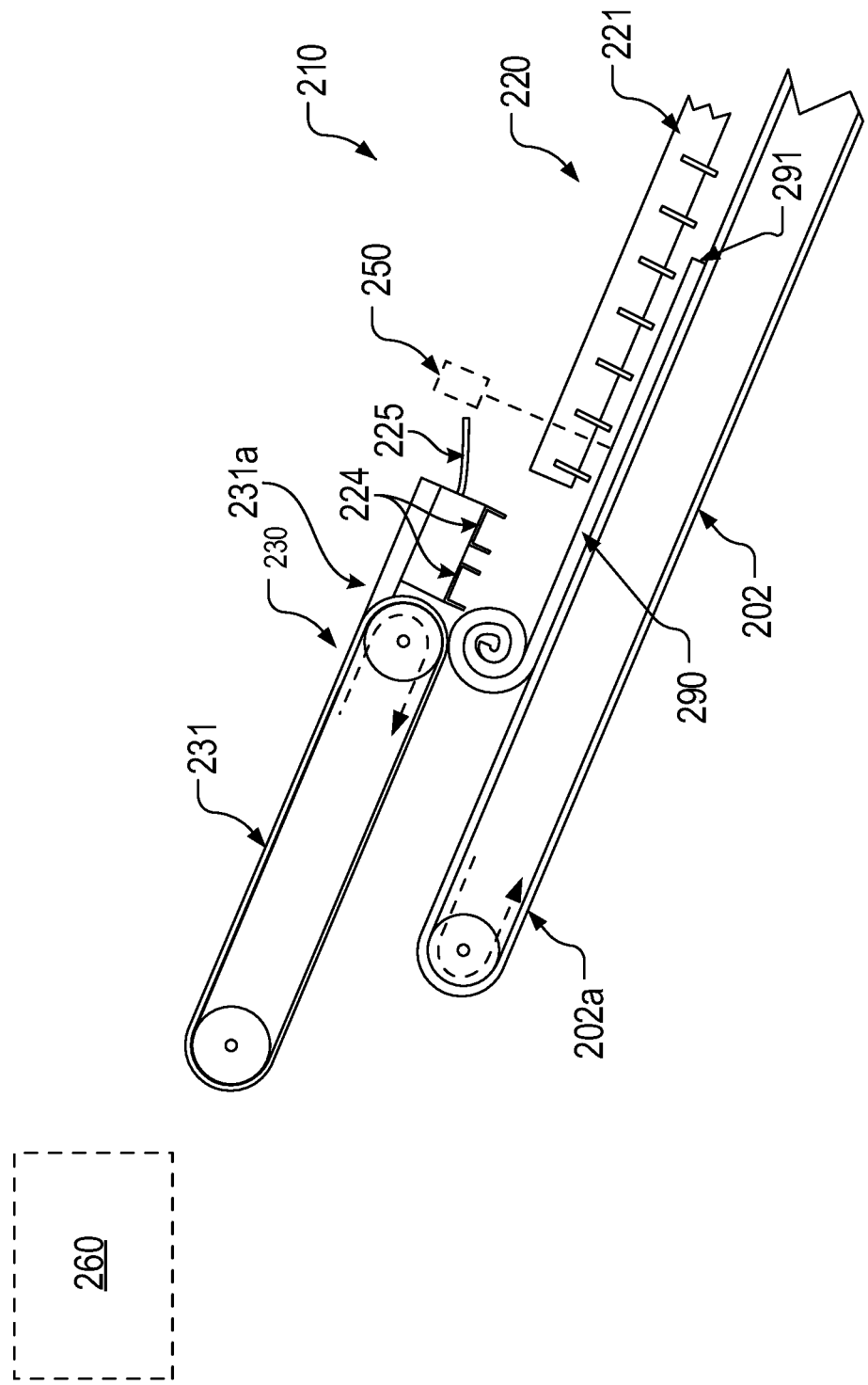

Turning to FIG. 2D, inclined conveyor 202 will cause the forming roll to continue advancing towards active roll-up mechanism 230. It is important to note that the roll is not yet fully formed such that a portion of slab 290—the tail—remains unrolled. As slab 290 is advanced along inclined conveyor 202, sensor 250 will continue to report the distance to the nearest object (which will be the tail of slab 290).

FIG. 2D also shows that the forming roll has reached upper conveyor 231. Control circuitry 260 can be configured to detect when the forming roll has reached upper conveyor 231 and can commence rotating upper conveyor 231 in the opposite direction from inclined conveyor 202. Control circuitry 260 could perform this detection in a number of ways. For example, control circuitry 260 could employ time $t_0$ (and/or time $t_1$) along with its knowledge of the rate of rotation of inclined conveyor 202 and the distance between sensor 250 and upper conveyor 231 to calculate how long it will take for the forming roll to reach upper conveyor 231. Alternatively, control circuitry 260 could employ signals from other sensors, such as sensor 251, to detect the presence of the forming roll at the leading end 231a of upper conveyor 231.

Although it is assumed that upper conveyor 231 is not rotating prior to the forming roll reaching its leading edge 231a, it is equally possible that upper conveyor 231 could already be rotating. In any case, once the forming roll reaches the leading edge 231a of upper conveyor 231, control circuitry 260 can cause upper conveyor 230 to be advanced a specified amount in a direction opposite the rotation of inclined conveyor (which would be clockwise in this example) to thereby advance the forming roll without causing it to be rolled up further. In other words, the opposite rotations of inclined conveyor 202 and upper conveyor 231 cause the forming roll to be advanced without rotation (or at least with minimal rotation) due to the fact that the respective belts which contact the forming roll will be moving in the same direction.

Figure 2E:
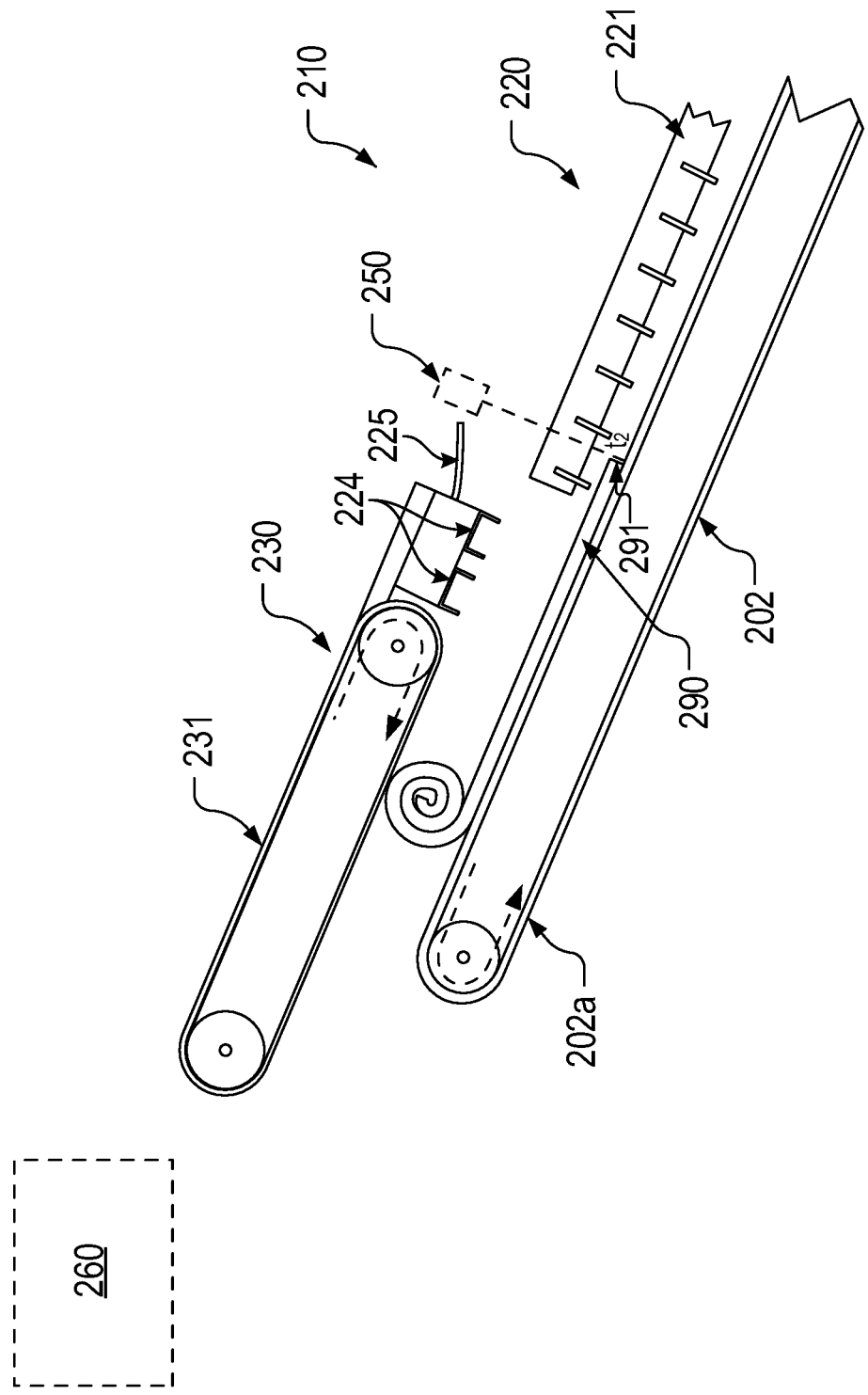

FIG. 2E illustrates how the forming roll is advanced without rotation such that it is positioned under upper conveyor 231. FIG. 2E also illustrates that the trailing edge 291 of slab 290 has passed beyond sensor 250. As a result, at time $t_2$, sensor 250 will report an abrupt increase in the distance to the nearest object (i.e., the difference between the top of slab 290 and belt 202a). Control circuitry 260 can detect this abrupt increase and determine that trailing edge 291 has reached sensor 250.

Control circuitry 260 can employ times $t_1$ and $t_2$ to calculate the length of the tail of slab 290. For example, based on its knowledge of the rate of rotation of inclined conveyor 202 and the difference between times $t_1$ and $t_2$, control circuitry 260 can determine how long the tail was at time $t_1$. Control circuitry 260 can then use its knowledge of how much of the tail would have been rolled up as slab 290 continued along ridges 224. In other words, control circuitry 260 can account for the additional rolling that occurs after time $t_1$ when determining how long the tail is at time $t_2$.

Figure 2F:
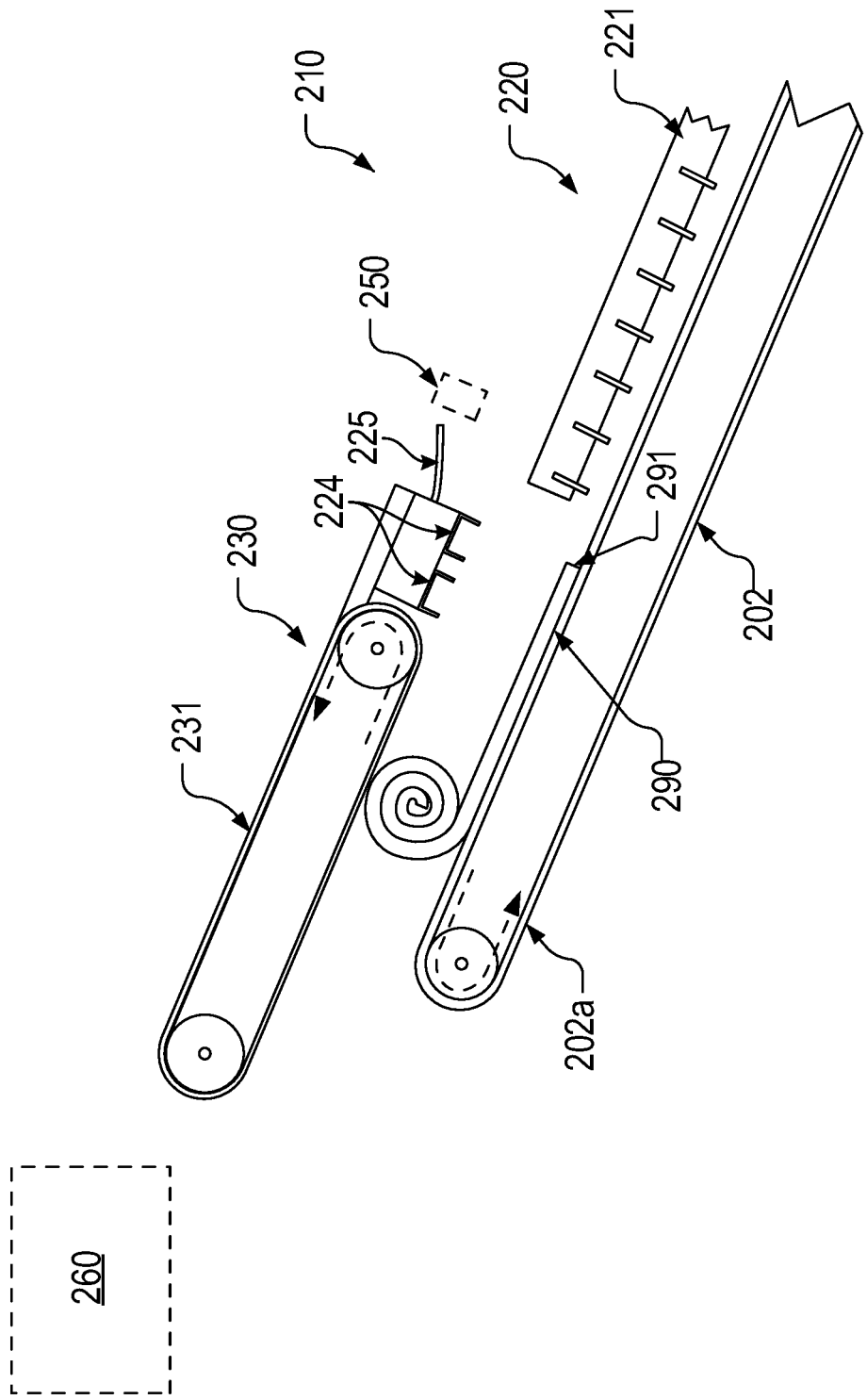

One reason for calculating the length of the tail at time $t_2$ is to determine how much upper conveyor 231 should be rotated to cause a completed roll to be formed. FIG. 2F represents this process of completing the roll. As shown, control circuitry 260 can cause the direction of rotation of upper conveyor 231 to be reversed (i.e., to be counterclockwise in this example). This reversal causes the respective belts that contact the forming roll to travel in opposite directions such that slab 290 will roll up. The speed of rotation of upper conveyor 231 can preferably be synchronized with the speed of rotation of inclined conveyor 202 so that the roll will rotate in place without traveling along inclined conveyor 202. Based on the calculated length of the tail of slab 290, control circuitry 260 can continue this reversed rotation of upper conveyor 231 until slab 290 has been fully rolled and to cause trailing edge 291 to be positioned in a desired orientation. In short, control circuitry 260 causes upper conveyor 231 to be rotated in the reverse direction long enough to complete the roll and position the trailing edge in the desired orientation.

In some embodiments, control circuitry 260 can employ the diameter of the forming roll (which could be detected using sensors 250 and 251) and the thickness of slab 290 (which could be detected using sensor 250 as part of detecting the trailing edge 291) in conjunction with the length of the tail to determine how long upper conveyor 231 should be rotated in the reverse direction. For example, the length of the tail that sensor 250 detects will be longer than the length of the tail at the time the forming roll reaches upper conveyor 231 since ridges 224 will further roll the slab. Sensor 250 can be employed to detect the diameter of the roll as it passes through passive roll-up mechanism 220 while sensor 251 can be employed to detect the diameter of the forming roll as it reaches or passes under upper conveyor 231. Control circuitry 260 can employ these detected diameters and a detected thickness of slab 290 to determine what the length of the tail is when it is positioned under upper conveyor 231.

With reference to the figures, control circuitry 260 will calculate the length of the tail at time $t_1$ as shown in FIG. 2C. However, when the forming roll reaches the position shown in FIG. 2D, the length of the tail will have become shorter. Control circuitry 260 can precisely determine what the length of the tail is when in the position shown in FIG. 2E (i.e., at the point where upper conveyor 231 will be reversed to complete the roll) using a calculation based on the current diameter of the forming roll relative to the diameter of the forming roll at time $t_1$, the detected thickness of the roll and the calculated length of the tail at time $t_1$.

In this example, it was assumed that time $t_2$ occurred before control circuitry 260 reversed the rotation of upper conveyor 231. However, this need not be the case. In some instances, control circuitry 260 could commence rotating upper conveyor 231 in the reverse direction before the trailing edge 291 is detected. In such cases, once the trailing edge 291 is detected, control circuitry 260 can calculate how much longer upper conveyor 231 should be rotated in the reverse direction to complete the roll and position the trailing edge 291 in the desired orientation.

Figure 2G:
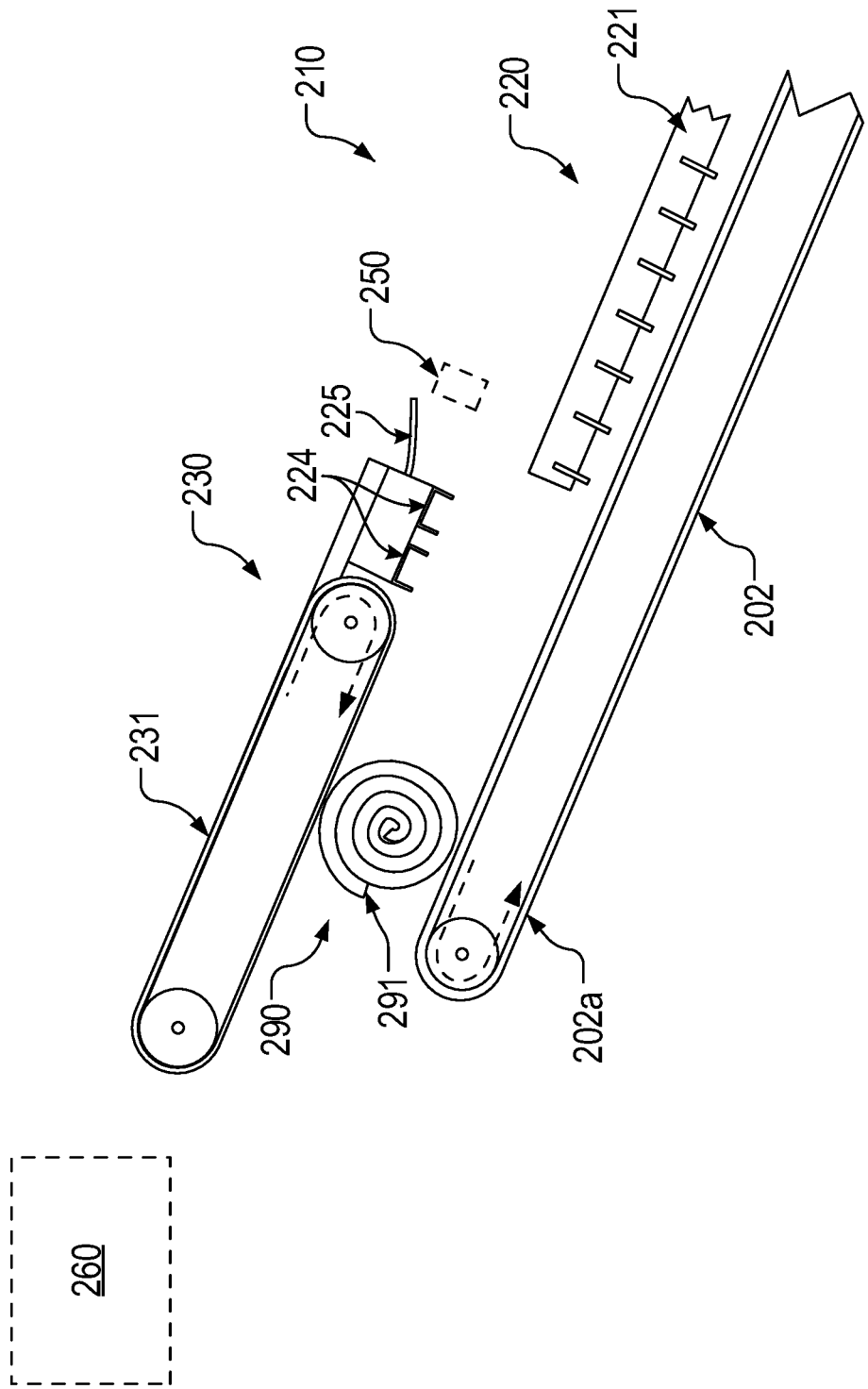
Figure 2H:
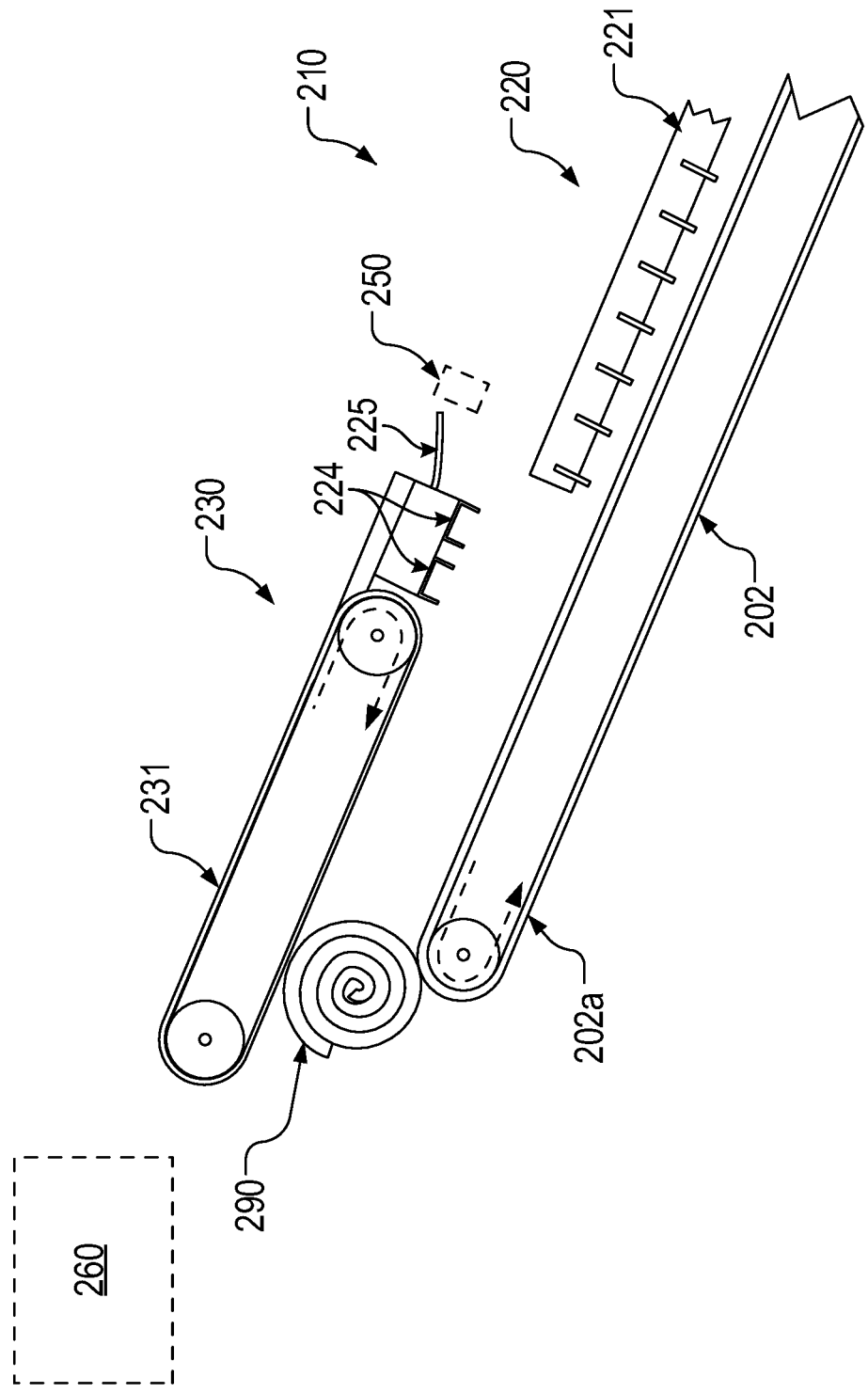

In FIG. 2G, it is assumed that upper conveyor 231 has caused the roll to be completed, including positioning the trailing edge 291 in the desired orientation. At this point, control circuitry 260 can again reverse the direction of rotation of upper conveyor 231 so that the respective belts that contact the completed roll again move in the same direction. As represented in FIG. 2H, this will cause the completed roll to be advanced towards stacking conveyor 203.

Although this example illustrates that the trailing edge 291 is positioned in the desired orientation as part of completing the roll, it is also possible to position the trailing edge 291 in the desired orientation as part of advancing the completed roll towards stacking conveyor 203. For example, in FIG. 2H, it is assumed that upper conveyor 231 and inclined conveyor 202 are rotated at the same rate to prevent rotation of the completed roll. However, it is also possible to rotate upper conveyor 231 at a different rate which will cause the completed roll to rotate as it advances.

Figure 3A:
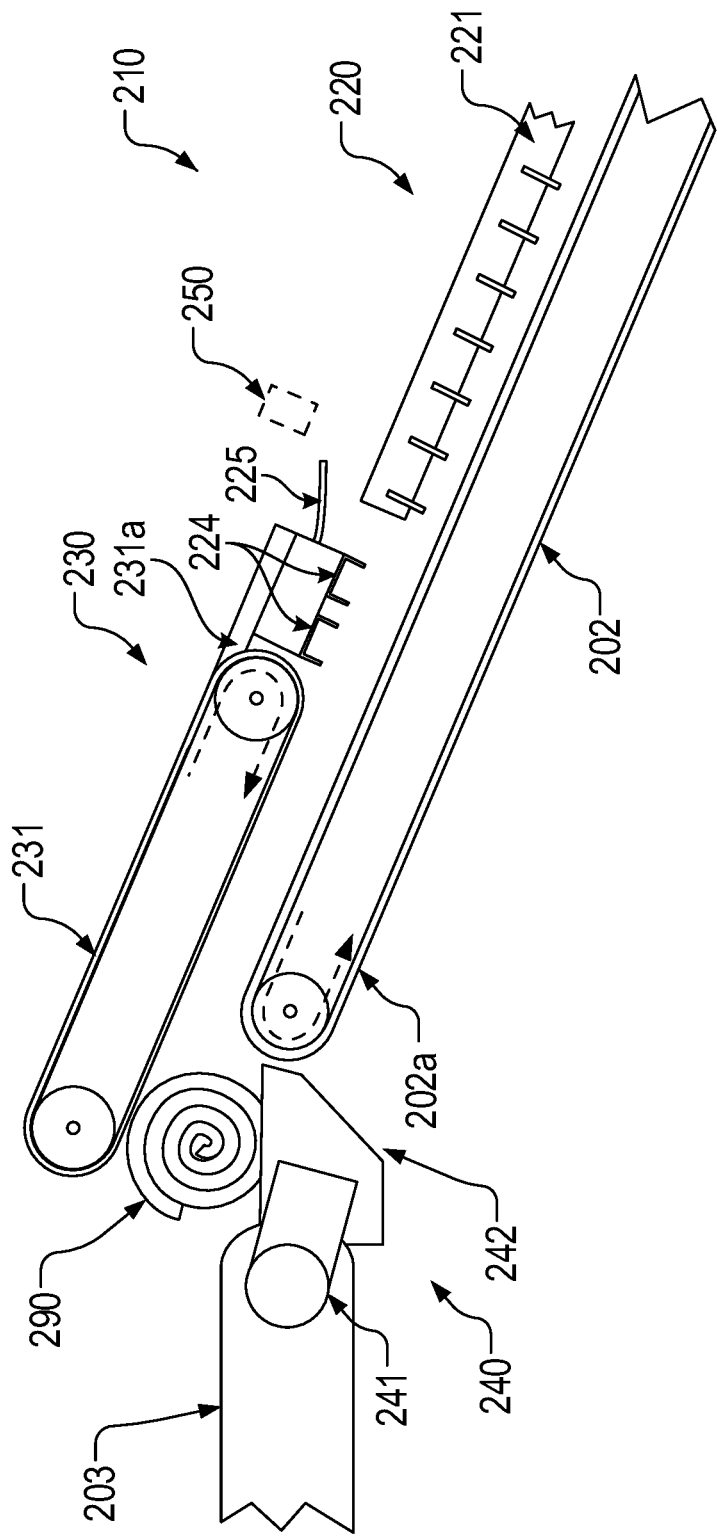
FIGS. 3A and 3B illustrate one example of how a sod roll can be transferred from the roll forming mechanism to the stacking conveyor.
Figure 3B:
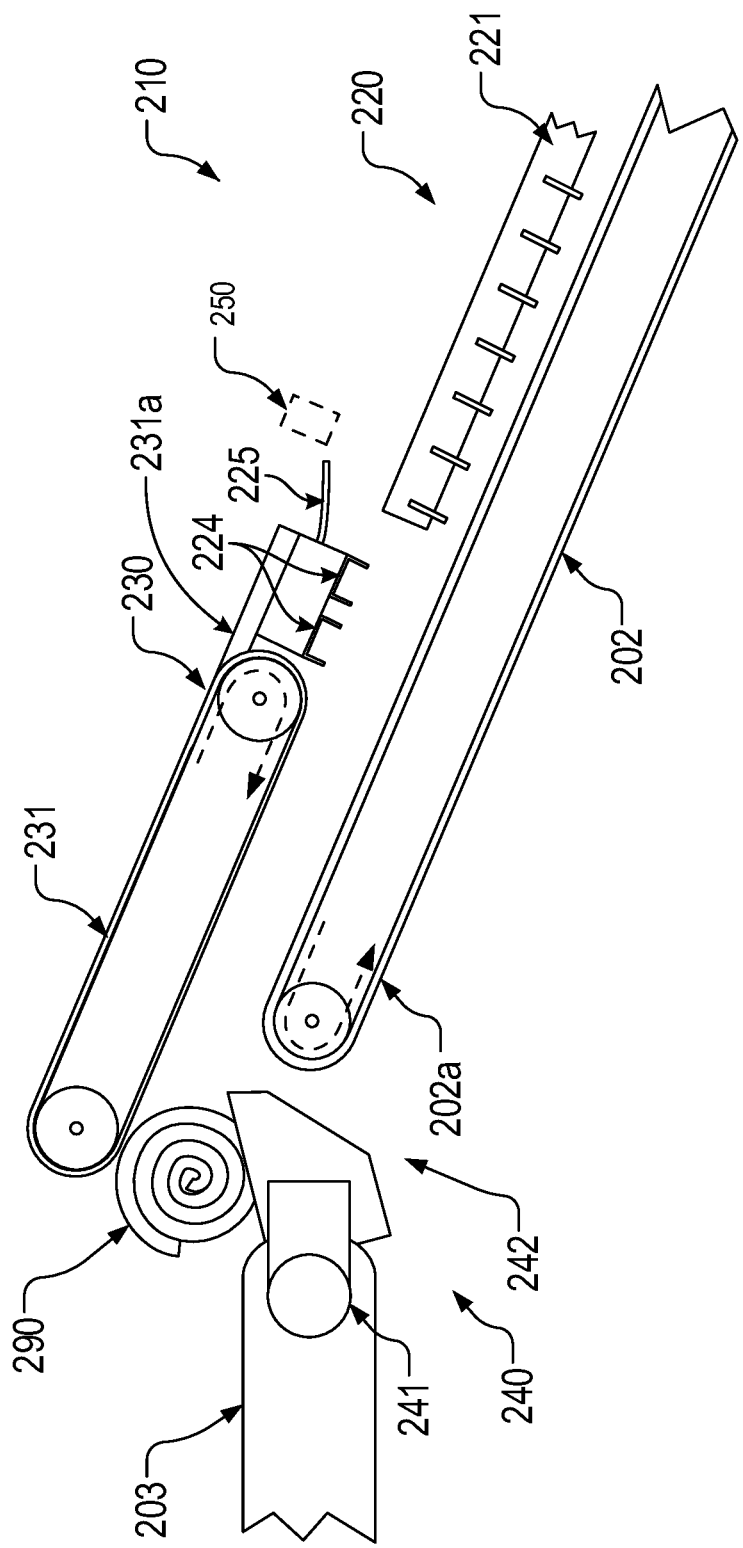
Figure 4A:
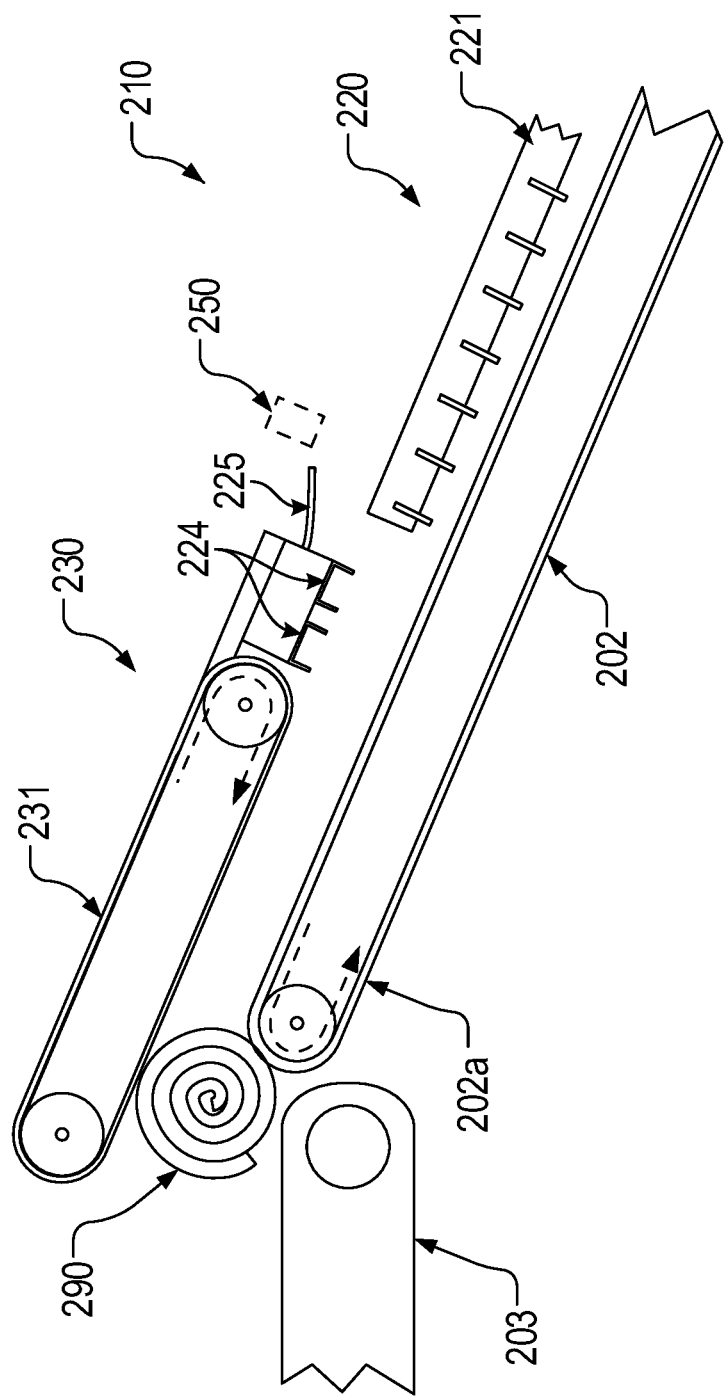
FIGS. 4A and 4B illustrate another example of how a sod roll can be transferred from the roll forming mechanism to the stacking conveyor.
Figure 4B:
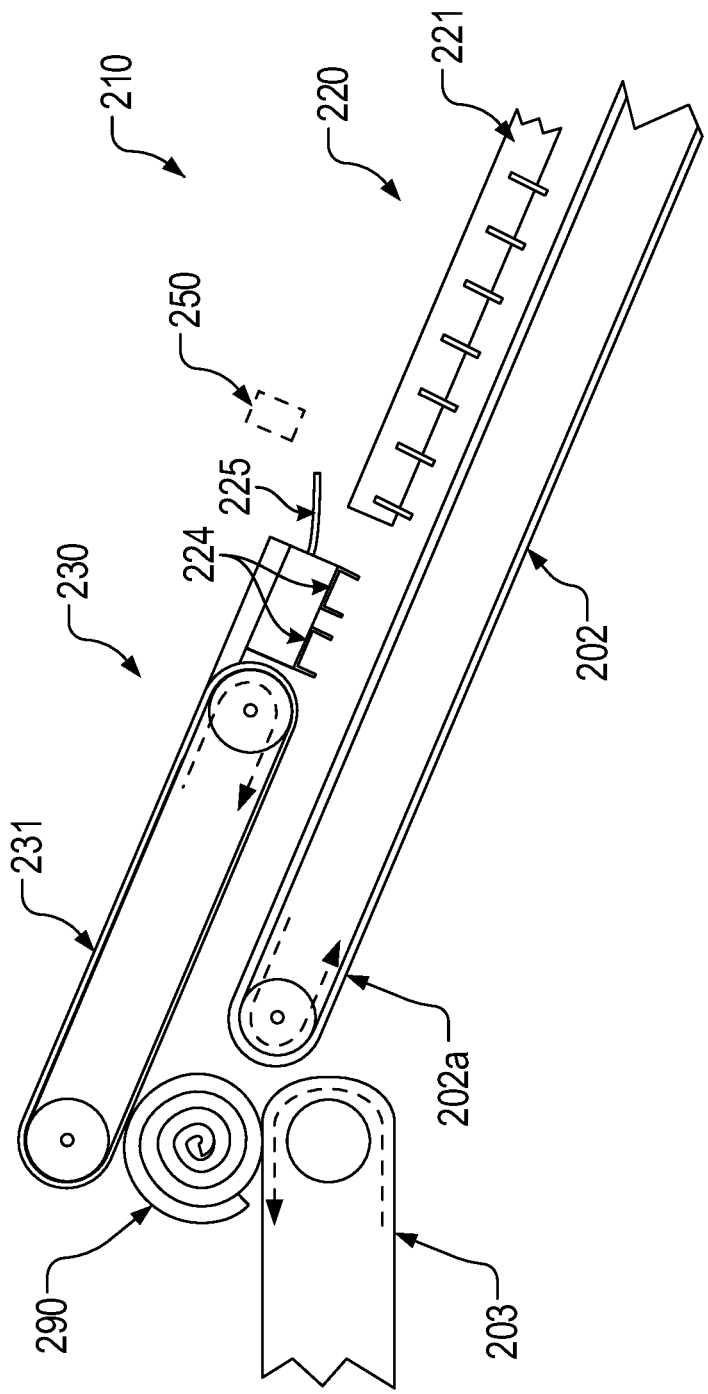

FIGS. 3A and 3B illustrate an example of how a completed roll can be transferred to stacking conveyor 203 using lift mechanism 240. As shown in FIG. 3A, upper conveyor 231 and inclined conveyor 202 have been rotated in opposite directions to cause the completed roll to be advanced into lift paddle 241. At this point, control circuitry 260 can cause upper conveyor 231 to cease rotating. Notably, as the completed roll passes into lift paddle 241, upper conveyor 231, which rests on top of the roll, will descend to remain in contact with the roll. Turning to FIG. 3B, as lift paddle 241 is rotated towards stacking conveyor 203, control circuitry 260 can cause upper conveyor 231 to commence rotating opposite the direction of inclined conveyor 202 (clockwise) which will prevent the trailing edge 291 from unrolling and may even tighten the roll. FIGS. 4A and 4B illustrate this same process when the completed roll is transferred directly onto stacking conveyor 203. As is shown, upper conveyor 231 can be rotated as the completed roll is transferred onto stacking conveyor 203 to prevent unrolling. After this rotation, upper conveyor 231 may be stopped until a subsequent forming roll reaches its leading end 231a at which point the process can be repeated to complete and transfer the subsequent roll.

Figure 5:
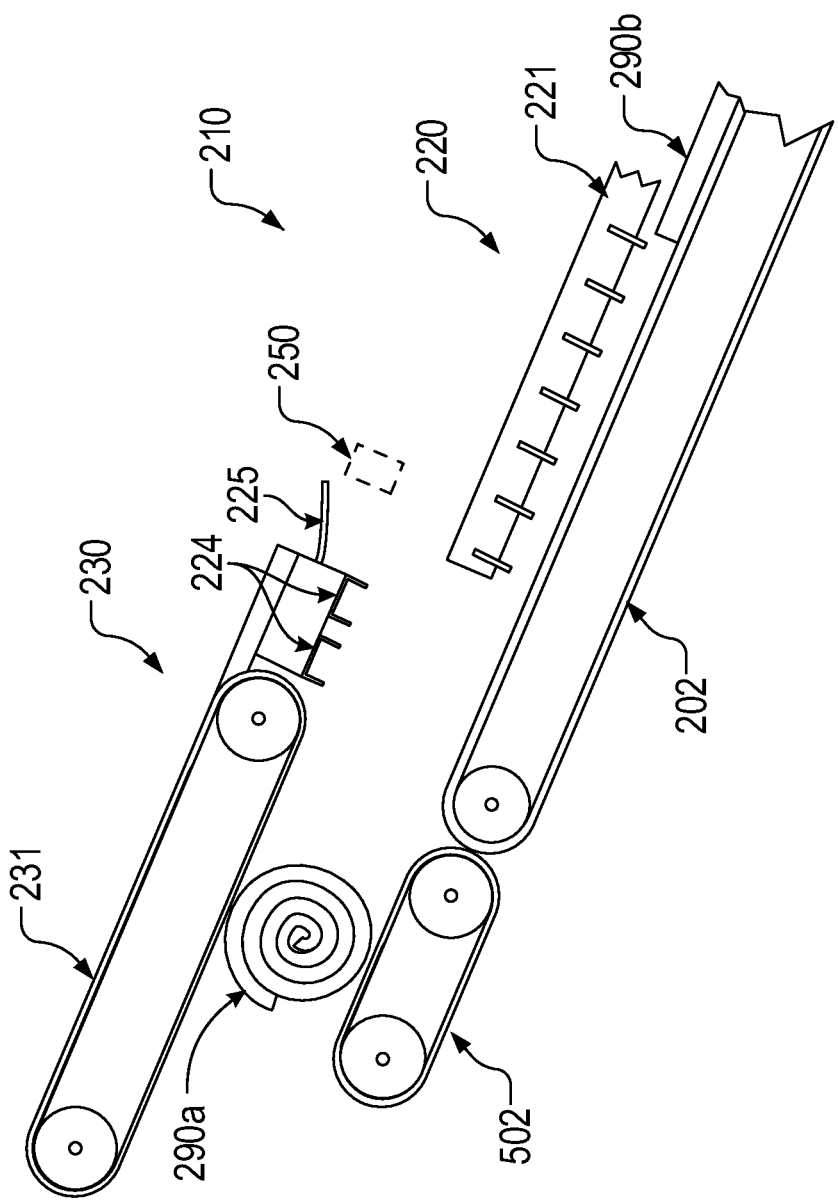
FIG. 5 illustrates an embodiment of a roll forming mechanism that includes an auxiliary conveyor for transferring the sod roll to the stacking conveyor.

FIG. 5 illustrates a variation of roll forming mechanism 210. In this variation, an auxiliary conveyor 502 is positioned above and in-line with inclined conveyor 202 and below upper conveyor 231. Because auxiliary conveyor 502 is separate from inclined conveyor 202, it can be rotated at a different rate from inclined conveyor 202. Importantly, this allows a completed roll to be transferred to stacking conveyor 203 at a speed that is not dependent on the rate of rotation of inclined conveyor 202.

More specifically, because inclined conveyor 202 will typically be advancing a subsequent slab 290b while the current slab 290a is still being formed, the rate of rotation of inclined conveyor 202 cannot be adjusted on the fly. However, by employing auxiliary conveyor 502, a completed roll could be transferred towards stacking conveyor 203 at a slower speed. For example, during the process of completing the roll, auxiliary conveyor 502 could be rotated at the same rate as inclined conveyor 202. Then, once the roll is completed, auxiliary conveyor 502 and upper conveyor 231 could be rotated at a relatively slow rate to cause the completed roll to be transferred gently into lift paddle 241 or onto stacking conveyor 203. This ability to transfer a completed roll at a slower speed facilitates clean and consistent placement of rolls on stacking conveyor 203 and therefore facilitates the formation of well-balanced pallets. While auxiliary conveyor 502 is rotated at the slower rate, inclined conveyor 202 can continue to rotate at its set rate to accommodate the subsequent slab 290b.

In some embodiments, control circuitry 260 can employ the signals from sensor 250 or other sensors to automatically adjust a cutting depth of the cutting head (e.g., cutting head 101). For example, between times to and $t_1$, the distance reported by sensor 250 will represent the thickness of slab 290 (i.e., the distance reported by sensor 250 will be directly proportional to the thickness of the slab 290 since the amount by which the slab will have been rolled up will be fixed). Control circuitry 260 can be configured with a preferred thickness value for a forming roll as it passes under sensor 250. If sensor 250 indicates that the forming roll has a thickness that deviates from the preferred thickness value by some threshold, control circuitry 260 can adjust the cutting depth of the cutting head accordingly. The same type of calculation can be performed using sensor 251 which can calculate the thickness of the completed roll and may therefore be more accurate. As is known, the cutting depth can vary based on the conditions of the field being cut. Therefore, this automatic adjustment to the cutting depth can ensure that slabs are cut with greater consistency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for forming a roll of sod comprising:
monitoring a slab of sod that is being rolled as the slab of sod travels along one or more inclined conveyors;
based on the monitoring, rotating an upper conveyor, that is positioned above the one or more inclined conveyors such that the slab of sod that is being rolled is between and in contact with the upper conveyor and the one or more inclined conveyors, a specified amount in a first direction that matches a direction of rotation of the one or more inclined conveyors to thereby cause the slab of sod to be formed into a roll between the upper conveyor and the one or more inclined conveyors; and
after the slab of sod has been formed into the roll between the upper conveyor and the one or more inclined conveyors and while the roll remains between and in contact with the upper conveyor and the one or more inclined conveyors, changing a direction of rotation of the upper conveyor to a second direction opposite the first direction to thereby cause the roll to be advanced between the upper conveyor and the one or more inclined conveyors towards a stacking conveyor.

2. The method of claim 1, wherein monitoring the slab of sod comprises:
detecting a length of a tail of the slab of sod;
detecting a diameter of the roll; and
detecting a thickness of the slab of sod.

3. The method of claim 2, wherein the specific amount is calculated based on the length of the tail of the slab of sod, the diameter of the roll and the thickness of the slab of sod.

4. The method of claim 1, wherein the specified amount is calculated based on a length of a tail of the slab of sod.

5. The method of claim 1, further comprising:
prior to rotating the upper conveyor the specified amount in the first direction, rotating the upper conveyor in the second direction to advance the slab of sod under the upper conveyor.

6. The method of claim 5, wherein the upper conveyor is rotated in the second direction to advance the slab of sod under the upper conveyor upon detecting that the slab of sod has been advanced to a leading end of the upper conveyor.

7. The method of claim 1, further comprising:
continuing to rotate the upper conveyor in the second direction to cause the roll to be advanced beyond the one or more inclined conveyors.

8. The method of claim 7, wherein the roll is advanced into a lift mechanism, the method further comprising:
temporarily ceasing the rotation of the upper conveyor; and
commencing the rotation of the upper conveyor in the second direction as the lift mechanism lifts the roll onto the stacking conveyor and while the upper conveyor contacts the roll.

9. The method of claim 7, wherein the upper conveyor extends rearwardly beyond the one or more inclined conveyors and wherein the upper conveyor continues to rotate as the roll is advanced onto the stacking conveyor and while the upper conveyor contacts the roll.

10. The method of claim 1, wherein the one or more inclined conveyors comprise one or more first inclined conveyors and an auxiliary conveyor, the upper conveyor being positioned above the auxiliary conveyor, and wherein rotating the upper conveyor in the second direction opposite the first direction comprises rotating the auxiliary conveyor and the upper conveyor at a rate that is different from a rate of rotation of the one or more first inclined conveyors to thereby cause the roll to be advanced towards the stacking conveyor.

11. The method of claim 10, wherein the rate at which the auxiliary conveyor and the upper conveyor are rotated is slower than the rate at which the one or more first inclined conveyors are rotated.

12. The method of claim 1, further comprising:
based on the monitoring, calculating a thickness of the slab of sod;
determining that the calculated thickness varies from a preferred thickness; and
adjusting a cutting height of a cutting head to cause subsequent slabs of sod to have the preferred thickness.

13. A sod harvester comprising:
a cutting head for cutting slabs of sod from the ground;
one or more inclined conveyors for conveying the slabs of sod towards a stacking conveyor;
a first roll-up mechanism that is positioned overtop the one or more inclined conveyors, the first roll-up mechanism being configured to commence forming the slabs of sod into rolls as the slabs of sod travel along the one or more inclined conveyors;
a second roll-up mechanism that is also positioned overtop the one or more inclined conveyors, the second roll-up mechanism including an upper conveyor that is configured to complete forming the slabs of sod into rolls;
one or more sensors; and
control circuitry that is configured to control rotation of the upper conveyor based on signals received from the one or more sensors, wherein the control circuitry causes the upper conveyor to rotate a specified amount in a first direction that matches a direction of rotation of the one or more inclined conveyors while the slabs of sod that are being rolled are between and in contact with the upper conveyor and the one or more inclined conveyors to thereby complete forming the slabs of sod into rolls between the upper conveyor and the one or more inclined conveyors and, while the rolls remain between and in contact with the upper conveyor and the one or more inclined conveyors, changing a direction of rotation of the upper conveyor to a second direction opposite the first direction to thereby cause the rolls to be advanced between the upper conveyor and the one or more inclined conveyors towards the stacking conveyor.

14. The sod harvester of claim 13, wherein the control circuitry processes the signals received from the one or more sensors to calculate a length of a tail of each of the slabs of sod that are being formed into rolls and then calculates the specific amount based on the calculated length.

15. The sod harvester of claim 13, wherein the control circuitry calculates the specified amount based on a detected length of a tail of the slabs of sod, a detected diameter of the rolls and a thickness of the slabs of sod.

16. The sod harvester of claim 13, wherein the control circuitry causes the upper conveyor to be rotated in the second direction to advance the slabs of sod that are being formed into rolls under the upper conveyor and then causes the upper conveyor to rotate the specified amount in the first direction.

17. The sod harvester of claim 13, wherein the one or more inclined conveyors comprise one or more first inclined conveyors and an auxiliary conveyor, wherein the first roll-up mechanism is positioned above the one or more first inclined conveyors and the second roll-up mechanism is positioned above the auxiliary conveyor, and wherein the control circuitry causes the upper conveyor and the auxiliary conveyor to be rotated at a rate that is different from a rate of rotation of the one or more first inclined conveyors when causing the rolls to be advanced towards the stacking conveyor.

18. The sod harvester of claim 13, wherein the upper conveyor extends rearwardly beyond the one or more inclined conveyors, and wherein the control circuitry causes the upper conveyor to rotate in the second direction after the rolls have been advanced beyond the one or more inclined conveyors but while the upper conveyor remains in contact with the rolls.

19. A method for forming a roll of sod comprising:
detecting a length of a tail of a slab of sod as the slab of sod is being formed into a roll while the slab of sod advances along one or more inclined conveyors;
detecting when the slab of sod has reached a front end of an upper conveyor that is positioned above the one or more inclined conveyors;
when the slab of sod has reached the front end of the upper conveyor, rotating the upper conveyor in a direction that is opposite a direction of rotation of the one or more inclined conveyors to thereby cause the slab of sod to be advanced under the upper conveyor;
while the slab of sod remains under the upper conveyor, rotating the upper conveyor a specified amount in a reverse direction to thereby cause the slab of sod to be formed into a complete roll, the specified amount being based on the detected length of the tail;
after the slab of sod has been formed into the complete roll, rotating the upper conveyor in the direction that is opposite the direction of rotation of the one or more inclined conveyors to thereby cause the roll to be advanced along the one or more inclined conveyors towards a stacking conveyor.

20. The method of claim 19, wherein the specified amount is also based on a detected diameter of the roll and a detected thickness of the slab of sod.

\* \* \* \* \*